(No Model.)
J. S. STEWART.
Hand Truck.
No. 229,770.                              Patented July 6, 1880.
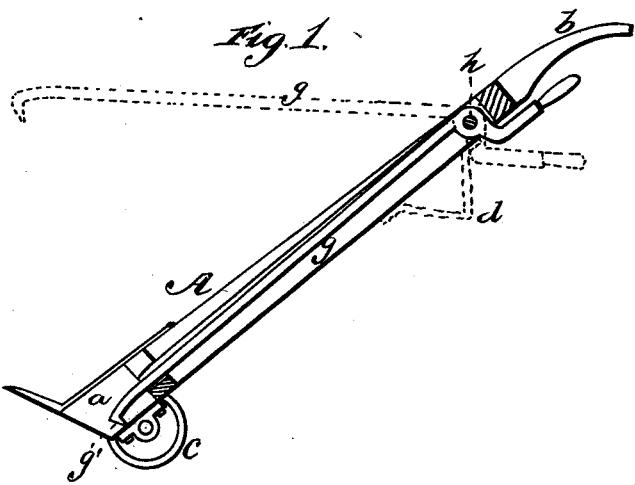
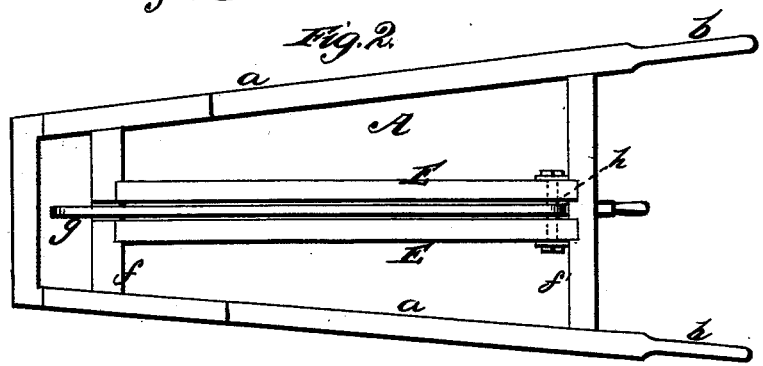
WITNESSES                                        INVENTOR
Robert Everett                          John S. Stewart,
James J. Sheehy                        Gilmore, Smith & Co.,
                                                      ATTORNEYS
N. PETERS, PHOTO-LITHOGRAPHER, WASHINGTON, D. C.

UNITED STATES PATENT OFFICE.

JOHN S. STEWART, OF MUSCODA, WISCONSIN.

HAND-TRUCK.

SPECIFICATION forming part of Letters Patent No. 229,770, dated July 6, 1880.

Application filed April 2, 1880. (No model.)

*To all whom it may concern:*

Be it known that I, JOHN S. STEWART, of Muscoda, in the county of Grant and State of Wisconsin, have invented certain new and useful Improvements in Hand-Trucks; and I do hereby declare that the following is a full, clear, and exact description of the construction and operation of the same, reference being had to the annexed drawings, making a part of this specification, and to the letters and figures of reference marked thereon.

Figure 1 of the drawings is a side elevation of my hand-truck, partly in section. Fig. 2 is a plan view of the same, and Fig. 3 is a detail view.

My invention relates to hand-trucks; and it consists in the features of construction and combination hereinafter described, and particularly pointed out in the claim.

A designates a truck-frame, which is provided with the usual side bars, $a$, handles $b$, inclined angle-plate at its forward end, and wheels $c$. The usual angle irons or legs $d$ are employed, in connection with the side bars, near the truck-handles.

E E are two centrally-arranged bars, which extend between the cross-bars $f f'$ of the truck-frame, these center bars being set with a space between them for the hinged bar $g$, which is hinged or pivoted, as at $h$, between the rear ends of the center bars; or, if preferred, one center bar may be recessed, so as to serve the same purpose as the two bars.

The bar $g$ has a hook, $g'$, at its forward end and a handle at its rear end, the handle being below the truck-frame and extending back between the handles, as shown.

By raising the handle end of the truck, and also raising the bar $g$ by depressing its handle, the operator can readily grapple objects with the hook.

What I claim is—

In a hand-truck, the combination of the bars E E and recessed lower bar, $f$, to receive the bar $g$, with the bar $g$, pivoted at $h$, and provided with a handle beneath the upper bar, $f'$, substantially as and for the purposes set forth.

In testimony that I claim the above I have hereunto subscribed my name in the presence of two witnesses.

JOHN SAMUEL STEWART.

Witnesses:
CHARLES J. McKITTRICK,
H. F. McNELLY.